Patented Jan. 18, 1938

2,105,489

UNITED STATES PATENT OFFICE 2,105,489

PROTECTIVE COVERING

William Henry Moss, London, England, assignor to Celanese Corporation of America, a corporation of Delaware No Drawing. Application August 10, 1934, Serial No. 739,238. In Great Britain August 24, 1933

12 Claims. (Cl. 91—68)

This invention relates to improvements in protective coverings and is more particularly concerned with the protection of electrical insulation, and especially rubber insulation or insulation with materials containing a high proportion of rubber or containing rubber substitutes.

As stated in U. S. Patent No. 1,977,643, the difficulties attendant upon the effective protection of rubber insulation upon cables or similar materials which are required to be highly flexible are considerable. According to that specification the protection of electrical insulation, and especially rubber insulation, is effected with the aid of cellulose derivative compositions containing more than 100 parts of a sulphonamide and/or tartrate plasticizer on the weight of the cellulose derivative. The present invention relates primarily to similar objects.

I have found that there are very considerable advantages in applying to the rubber or other insulating material a highly plasticized undercoat such as is described and claimed in U. S. Patent No. 1,977,643, and applying a top coat of a cellulose derivative composition containing a plasticizer which has not such a high solvent power for the cellulose derivative as has the plasticizer in the undercoat. By this means a highly flexible soft undercoat is produced and the top coat, though it may be highly flexible, is nevertheless harder than the undercoat, and hence presents greater resistance to wear and obviates or lessens any tendency of the protected cable or like electrical apparatus to stick together by reason of the highly plastic character of the protective undercoating. It is possible to have a soft undercoat coupled with a hard top coat by employing in the top coat a plasticizer similar to that employed in the undercoat but in a smaller proportion. This, however, has the disadvantage that the top coat lacks flexibility, and in addition any volatilization of the plasticizer from the top coat with ageing produces a serious diminution in the limited amount of plasticizer in that top coat. I have found that the top coat may be plasticized with a type of plasticizer, which, while being compatible with the cellulose derivative in high proportions, and especially proportions over 100% on the weight of the cellulose derivative, has nevertheless a limited solvent power for the cellulose derivative, i. e. is not a true solvent for the cellulose derivative, or at least has a much lower solvent power than the plasticizer employed according to U. S. Patent No. 1,977,643, and hence stickiness is avoided or comparatively limited. Preferably a plasticizer which is not a true solvent is employed.

Accordingly the present invention particularly contemplates an undercoat containing a relatively high proportion, for example between 100 and 200% on the weight of the cellulose derivative, of a plasticizer or mixture of plasticizers which have a high solvent power upon the cellulose derivative coupled with a top coat containing a high proportion, e. g. 100, 150, or 200% or more of the cellulose derivative, of a plasticizer or mixture of plasticizers which, while sufficiently compatible with the cellulose derivative to be incorporated therewith in high proportions, has nevertheless only a limited solvent power for the cellulose derivative. As examples of suitable plasticizers for use in the undercoat the aromatic sulphonamides and derivatives thereof, for instance the N-alkylated aromatic sulphonamides, and also the tartrate esters referred to in U. S. Patent No. 1,977,643 and triacetin may be instanced. Such plasticizers, for example the isomeric xylene monomethyl sulphonamides or similar N-alkylated aromatic sulphonamides, dibutyl tartrate and di-isoamyl tartrate, may, as described in that specification, be employed in admixture with other plasticizers which have a low compatibility with the cellulose derivative, for example triphenyl phosphate, tricresyl phosphate, diphenylol propane and diethyl phthalate or other aryl phosphates or alkyl or aryl phthalates. As to the method of using the plasticizers of high solvent power with plasticizers of lower compatibility, reference is made to U. S. Patent No. 1,977,643.

As previously stated, the plasticizer in the top coat is preferably a plasticizer which is not itself a true solvent for the cellulose derivative, but, nevertheless, has a high compatibility with the cellulose derivative, for example a compatibility to the extent of over 100%, and preferably over 200 or even up to 300 or 400% or more on the weight of the cellulose derivative. Plasticizers of this nature for acetone-soluble cellulose acetate may be obtained by the esterification of glycerol with mixtures of acetic and phenyl-acetic acids. In general, suitable plasticizers for the top coat may be made by decreasing the solvent power for the cellulose derivative of the plasticizers of high solvent power referred to above in connection with the undercoat, for example the sulphonamides, tartrates and triacetin. Thus, it has been found that a particularly valuable plasticizer may be obtained by the introduction of three phenyl groups into triacetin to make triphenyl acetin, which yields a plasticizer which is of limited solvent power for the cellulose acetate and yet has a very high compatibility. Other similar plasticizers are the phenoxy acetins, e. g. the diphenoxy mono-acetin, the mixed esters of glycol with acetic and phenyl-acetic or phenoxy-acetic acid. Similarly, plasticizers for the top coat of the character referred to may be obtained by substituting or adding groups, and particularly aromatic or cyclic hydrocarbon radicles, in the ordinary dibutyl tartrate and sulphonamide plasticizers. Thus, for example, the aromatic sulphonamides and N-alkylated aromatic sulphonamides if loaded by means of phenyl, cyclohexyl or other aromatic or hydroaromatic radicles or even higher aliphatic hydrocarbon radicles, e. g. the iso-amyl and hexyl radicles, decrease in solvent power and yield plasticizers which are suitable for the top coat. A similar loading of the tartrate plasticizers of high solvent power produces products, for example dibenzyl tartrate, suitable for the purposes of the present invention. Other plasticizers of this character are, for example, di-isoamyl phthalate, β-phenoxy-ethyl phthalate, butyl-cyclo-hexyl phthalate, iso-amyl-cyclo-hexyl phthalate, benzyl-ethyl phthalate and dibenzyl phthalate. In a similar manner the triaryl phosphates, which, as is well known, have a very low compatibility with acetone-soluble cellulose acetate may be modified so as to increase their compatibility to obtain plasticizers suitable for the top coat, for example, by the introduction of oxy or ketonic groups into such plasticizers of low compatibility. A suitable plasticizer of the class is tri-resorcinol phosphate. Other plasticizers which are suitable for the purpose of the present invention include glycerine-diacetate-mono-acetyl-salicylate and substances of similar constitution.

Instead of using plasticizers of limited solvent power, mixtures of plasticizers may be employed which contain plasticizers of high solvent power and plasticizers of low compatibility, the proportions being chosen so that the mixtures have similar properties to the plasticizers of limited solvent power.

Many of the plasticizers listed above for the top coat are new plasticizers in connection with plastic materials generally, for example cellulose nitrate, cellulose acetate, cellulose ethers and other organic or inorganic derivatives of cellulose and vinyl acetate and other poly-vinyl compounds, and such plasticizers are suitable for the manufacture of plastic materials of all kinds, for example celluloid-like masses, films, lacquers, sheets, rods, tubes, filaments and other materials made of or containing the cellulose derivatives, vinyl compounds or other film-forming bases.

The plasticizers for the top coat may, of course, be included in the undercoat in the same way that plasticizers of low compatibility may be included together with the plasticizers of high solvent power. However, the proportion of plasticizer in the undercoat is preferably adjusted so that the undercoat is very soft. By means of the present invention it is possible to obtain a soft undercoat containing, for example, 100 to 200% of plasticizer based on the cellulose derivative and a top coat which is much harder and yet contains substantially the same proportion or even a higher proportion of plasticizer. Thus, for example, good results are obtained using an undercoat containing per 100 parts of acetone-soluble cellulose acetate 50 parts of triphenyl acetin and 90 parts of the isomeric xylene mono-methyl sulphonamides and the top coat containing per 100 parts of acetone-soluble cellulose acetate 160 parts of triphenyl acetin, i. e. a higher percentage of plasticizer than in the undercoat.

The compositions for the undercoats and top coats according to the present invention may be applied to the materials in any suitable form. For example, compositions such as those described above may be molded on to the insulated cable or other insulated electrical apparatus under the action of heat and pressure in the absence of substantial quantities of solvents or diluents. Alternatively, solvents or mixtures of solvents of low, medium and/or high boiling point may be incorporated in the compositions so as to obtain compositions which are flowable at ordinary temperatures. Among suitable solvents for this purpose are acetone, methyl acetate, alcohol, benzene, methyl-ethyl-ketone, ethylene dichloride or mixtures thereof as volatile solvents and dioxane, ethyl lactate, and ethyl lactate and the ethers and ether-esters of ethylene glycol, e. g. methyl glycol and ethyl glycol mono-acetate, as medium boiling solvents.

The base of the protective coatings may, as previously indicated, be acetone-soluble cellulose acetate or may be cellulose formate, cellulose propionate, cellulose butyrate or higher members of this series or other cellulose esters including mixed esters, e. g. cellulose nitro-acetate and acetate propionate, or may be cellulose ethers, for example, ethyl, methyl or benzyl cellulose or mixed ethers or mixed ether-esters, e. g. ethyl cellulose acetate. Poly-vinyl compounds may also be employed as the base of the protective coatings or mixtures of poly-vinyl compounds with cellulose derivatives.

Natural, semi-synthetic, or synthetic resins may also be included in the compositions, e. g. to improve their strength, and, especially where the compositions are to be used directly for coating purposes, to increase their adhesive properties. Synthetic resins may also have a beneficial action on the compatibility of the plasticizer and cellulose derivative in the compositions, and may enable increased quantities of plasticizer to be used without danger of the plasticizer blooming out. Among synthetic resins suitable for use in accordance with this invention are those obtainable by the condensation of phenols and aldehydes or ketones, e. g. phenol formaldehyde and phenol furfural resins and particularly condensation products of the complex phenols such as diphenylol propane, for example diphenylol propane-formaldehyde resins, diphenylol propane-acetone resins, diphenylol propane-furfural resins. Amongst other resins suitable for use in accordance with the present invention may be mentioned furfural-ketone resins, furfural-amine resins, resins obtainable by the condensation of aldehydic or ketonic substances with aromatic amino or aryl sulphonamide or N-amino substituted aryl sulphonamide compounds, resins derived from the condensation of ureas or thioureas with aldehydic substances with or without phenolic bodies, lactic acid resins, sulphurized phenol resins and resins obtainable by the polymerization of aldehydes or vinyl compounds. In general when synthetic resins are present in the compositions it is preferred to use up to about 30% to 40% of synthetic resin based on the weight of cellulose derivative present, but higher percentages may in some cases be used.

The compositions may be applied to the insulated conductors, and particularly cables insulated or sheathed with rubber, in a variety of ways. Thus, they may be used directly as coatings for the insulating or sheathing material. For example, a rubber insulated or sheathed cable may be passed directly through a bath containing the molten or dissolved composition and any excess composition removed by suitable means, for example by passing the insulated cable through a die. Again, the compositions may be dissolved in solvents and applied by brushing or spraying. In applying the compositions, and particularly relatively liquid compositions such as those containing volatile solvents, it is advisable to apply a number of relatively thin coatings and to dry each coating before the application of the next coating. A further method consists in passing the cable or insulated conductor through an annular stream of the composition which is thus applied in a continuous manner. Again, as indicated, the compositions may be molded on to the cables or insulated conductors, or extruded around them.

Not only may the compositions be applied directly to cables or insulated conductors as above described, but they may also be applied to tapes, ribbons, or films wound or subsequently to be wound around the insulating material or sheath, or to a fabric with which the insulating material or sheath is covered or to be covered. These tapes, films, fabrics and the like may be of any suitable material, e. g. cellulose acetate or other cellulose derivative, silk, cotton, or regenerated cellulose, and may be woven, knitted, or netted, and the tape may be of the so-called bias type. Furthermore, I have found that high flexibility may be obtained while using a foundation material by employing for example a warp of threads, say thousands of threads aligned side by side, or a relatively limited number of threads close together, and doping the same with the compositions so that on drying they adhere to each other and form a fabric or tape. If desired, such a warp or such a collection of individual threads may be held together at more or less long intervals by suitable wefts.

When tapes or other materials containing a cellulose derivative are employed precautions should be taken to avoid any deleterious action on the material by solvents or the like present in the composition. Thus a tape having a basis of cellulose acetate may be coated with a composition comprising ethyl cellulose in a medium which is not a solvent for cellulose acetate.

The undercoat and top coat may be applied separately to different tapes, ribbons, films, fabric or the like or to different layers of tape, ribbon, film, fabric or the like, for example by winding a cable with one or more layers of tape, impregnating with the undercoating composition, winding with a further layer or layers of tape and then impregnating with the top coating composition, or both undercoat and top coat may be applied successively to the same tape, ribbon, film, fabric or the like. The tapes, ribbons or fabrics may be of any suitable construction, for example bias tape or plain weave tape or woven, knitted or netted fabric.

The compositions may be applied to a film, fabric, or tape by any suitable method, for example by spraying a solution on to the material so as to fill completely the interstices between the component threads of the material, or by any other suitable means, for example those described for the application of compositions to the insulated conductor itself. The layers of impregnated material may if desired be caused to adhere to each other when wound round the insulated conductor. Thus for example a cable wound with the impregnated material, e. g. tape, may be subjected to the action of heat so as to soften the composition and cause the layers of impregnated material to stick together. If desired such heating may take place simultaneously with vulcanization of the rubber or like insulating material or sheath, and for this purpose it is often convenient, as in the known art, to cover the insulated cable wound with the impregnated material with a lead sheath, to subject it to the action of heat while enclosed in the lead sheath, and finally to remove the lead sheath. As a further alternative solvents or softening agents may be applied in liquid or vapor form to cause or to assist the adherence of the individual layers of impregnated tape or the like.

While the invention has been described above particularly in relation to the protection of rubber insulation on electric cables and other electrical apparatus, it may be applied broadly to the protection of any insulating material, particularly where high flexibility is required as in cable work, and also to the protection of any other materials, again, particularly where flexibility is required as, for example, in Bowden cables.

Further, while the compositions of the present invention are particularly valuable in conjunction with soft and flexible undercoats, e. g. of the compositions described in U. S. Patent No. 1,977,643, they may also be employed in conjunction with other coatings or alone.

The following are examples of suitable compositions which may be employed according to the present invention. If it is desired to apply them in solution a suitable solvent medium consists of about 400 parts of acetone, 160–180 parts of alcohol and 240–220 parts of benzene per 100 parts of cellulose derivative.

TOP COATS

*Example 1*

|  | Parts |
|---|---|
| Cellulose acetate | 100 |
| Triphenylacetin | 160 |

*Example 2*

|  | Parts |
|---|---|
| Cellulose acetate | 100 |
| Triphenylacetin | 120 |
| Isomeric xylene mono-methyl sulphonamides | 15–30 |

*Example 3*

|  | Parts |
|---|---|
| Cellulose acetate | 100 |
| Triphenylacetin | 230 |

*Example 4*

|  | Parts |
|---|---|
| Cellulose acetate | 100 |
| Triphenylacetin | 140 |
| Dibutyl tartrate | 45 |

*Example 5*

|  | Parts |
|---|---|
| Ethyl cellulose | 100 |
| Triphenylacetin | 85 |

*Example 6*

The following is an example of a composition containing a plasticizer of high solvent power and a plasticizer of low compatibility:—

| | Parts |
|---|---|
| Cellulose acetate | 100 |
| Isomeric xylene mono-methyl sulphonamides | 130 |
| Dibutyl phthalate | 30 |

Instead of the sulphonamides an equal weight of diglycerol tetra-acetate, which is sold under the trade name of "Glyakol", may be employed.

UNDER COATS

*Example 7*

| | Parts |
|---|---|
| Cellulose acetate | 100 |
| Triphenylacetin | 50 |
| Isomeric xylene mono-methyl sulphonamides | 90 |

*Example 8*

| | Parts |
|---|---|
| Cellulose acetate | 100 |
| Triphenylacetin | 60 |
| Isomeric xylene mono-methyl sulphonamides | 60 |

*Example 9*

| | Parts |
|---|---|
| Cellulose acetate | 100 |
| Dibutyl tartrate | 100 |
| Tricresyl phosphate | 20 |

*Example 10*

| | Parts |
|---|---|
| Cellulose acetate | 100 |
| Synthetic resin (diphenylol-propane formaldehyde resin) | 30 |
| Dibutyl tartrate | 120 |
| Triphenyl phosphate | 20 |

*Example 11*

| | Parts |
|---|---|
| Ethyl cellulose | 100 |
| Castor oil | 60 |

*Example 12*

| | Parts |
|---|---|
| Ethyl cellulose | 100 |
| Castor oil | 40 |
| Dibutyl phthalate | 20 |

Preferably the same cellulose derivative is present in both under and top coats, e. g. the composition of Example 5 is preferably employed in conjunction with that of Example 10 or 11.

It is to be understood that the term "plasticizer" as employed hereinafter in the claims includes within its scope mixtures of plasticizers.

What I claim and desire to secure by Letters Patent is—

1. Protective coating materials comprising a tape, ribbon, film, fabric or the like coated with a composition containing a lacquer base and a proportion of the order of at least 60% of the weight thereof of plasticizer of high solvent power and having an outer layer of a composition containing a lacquer base and a proportion of the order of at least 85% of the weight thereof of plasticizer of high compatibility but limited solvent power.

2. Articles, and particularly insulated conductors and other insulated articles, protected with a tape, ribbon, film, fabric or the like coated with a composition containing a cellulose derivative lacquer base and a proportion of the order of at least 60% of the weight thereof of plasticizer of high solvent power and having an outer layer of a composition containing a cellulose derivative lacquer base and a proportion of the order of at least 85% of the weight thereof of plasticizer of high compatibility but limited solvent power.

3. Articles, and particularly insulated conductors and other insulated articles, protected with an undercoat of a composition containing a cellulose derivative lacquer base and a proportion of the order of at least 60% of the weight thereof of plasticizer of high solvent power and a top coat of a composition containing a cellulose derivative lacquer base and a proportion of the order of at least 85% of the weight thereof of plasticizer of high compatibility but limited solvent power.

4. Insulated conductors and other insulated articles which are insulated at least partly with rubber and which are protected by a tape, ribbon, film, fabric or the like coated with a composition containing a cellulose derivative lacquer base and a proportion of the order of at least 60% of the weight thereof of plasticizer of high solvent power and having an outer layer of a composition containing a cellulose derivative lacquer base and a proportion of the order of at least 85% of the weight thereof of plasticizer of high compatibility but limited solvent power.

5. Insulated conductors and other insulated articles which are insulated at least partly with rubber which are protected by an undercoat of a composition containing a cellulose derivative lacquer base and a proportion of the order of at least 60% of the weight thereof of plasticizer of high solvent power and a top coat of a composition containing a cellulose derivative lacquer base and a proportion of the order of at least 85% of the weight thereof of plasticizer of high compatibility but limited solvent power.

6. Articles, and particularly insulated conductors and other insulated articles, protected by tapes, ribbons, films, fabrics and like materials coated with a composition containing cellulose acetate and a proportion of the order of at least 60% of the weight thereof of plasticizer of high solvent power therefor, and by an outer layer of a composition containing cellulose acetate and a proportion of the order of at least 85% of the weight thereof of plasticizer highly compatible with such cellulose acetate but having a limited solvent power therefor.

7. Electrical conductors and other electrical articles insulated at least partly with rubber and protected by an undercoat of a composition containing cellulose acetate and at least 100%, based on the weight of the cellulose acetate, of plasticizer of high solvent power for the cellulose acetate, and a top coat of a composition containing cellulose acetate and at least 100%, calculated on the weight of the cellulose acetate, of plasticizer highly compatible with the cellulose acetate but having a limited solvent power therefor.

8. Electrical conductors and other electrical articles insulated at least partly with rubber and protected by an undercoat of a composition containing cellulose acetate and at least 100%, based on the weight of the cellulose acetate, of plasticizer selected from the group consisting of aromatic sulphonamides and derivatives thereof and tartrate esters, and a top coat of a composition containing cellulose acetate and at least 100%, calculated on the weight of the cellulose acetate, of plasticizer highly compatible with the cellulose acetate but having a limited solvent power therefor.

9. Electrical conductors and other electrical articles insulated at least partly with rubber and protected by an undercoat of a composition containing cellulose acetate and a proportion of the order of at least 60% of the weight thereof of plasticizer of high solvent power therefor, and a top coat of a composition containing cellulose acetate and a proportion of the order of at least 100% of the weight thereof of an aralkyl ester of glycerine highly compatible with the cellulose acetate but having a limited solvent power therefor.

10. Electrical conductors and other electrical articles insulated at least partly with rubber and protected by an undercoat of a composition containing cellulose acetate and at least 100%, based on the weight of the cellulose acetate, of plasticizer selected from the group consisting of aromatic sulphonamides and derivatives thereof and tartrate esters, and a top coat of a composition containing cellulose acetate and at least 100%, calculated on the weight of the cellulose acetate, of an aralkyl ester of glycerine highly compatible with the cellulose acetate but having a limited solvent power therefor.

11. Electrical conductors and other electrical articles insulated at least partly with rubber and protected by an undercoat of a composition containing cellulose acetate and a proportion of the order of at least 60% of the weight thereof of plasticizer of high solvent power therefor, and a top coat of a composition containing cellulose acetate and a proportion of the order of at least 100% of the weight thereof of triphenyl acetin.

12. Electrical conductors and other electrical articles insulated at least partly with rubber and protected by an undercoat of a composition containing cellulose acetate and at least 100%, based on the weight of the cellulose acetate, of plasticizer selected from the group consisting of aromatic sulphonamides and derivatives thereof and tartrate esters, and a top coat of a composition containing cellulose acetate and at least 100% based on the weight of the cellulose acetate, of triphenyl acetin.

WILLIAM HENRY MOSS.